No. 619,187. Patented Feb. 7, 1899.
J. C. KINNEY.
PREPAYMENT MECHANISM FOR ELECTRIC METERS.
(Application filed Apr. 18, 1898.)
(No Model.) 2 Sheets—Sheet 1.
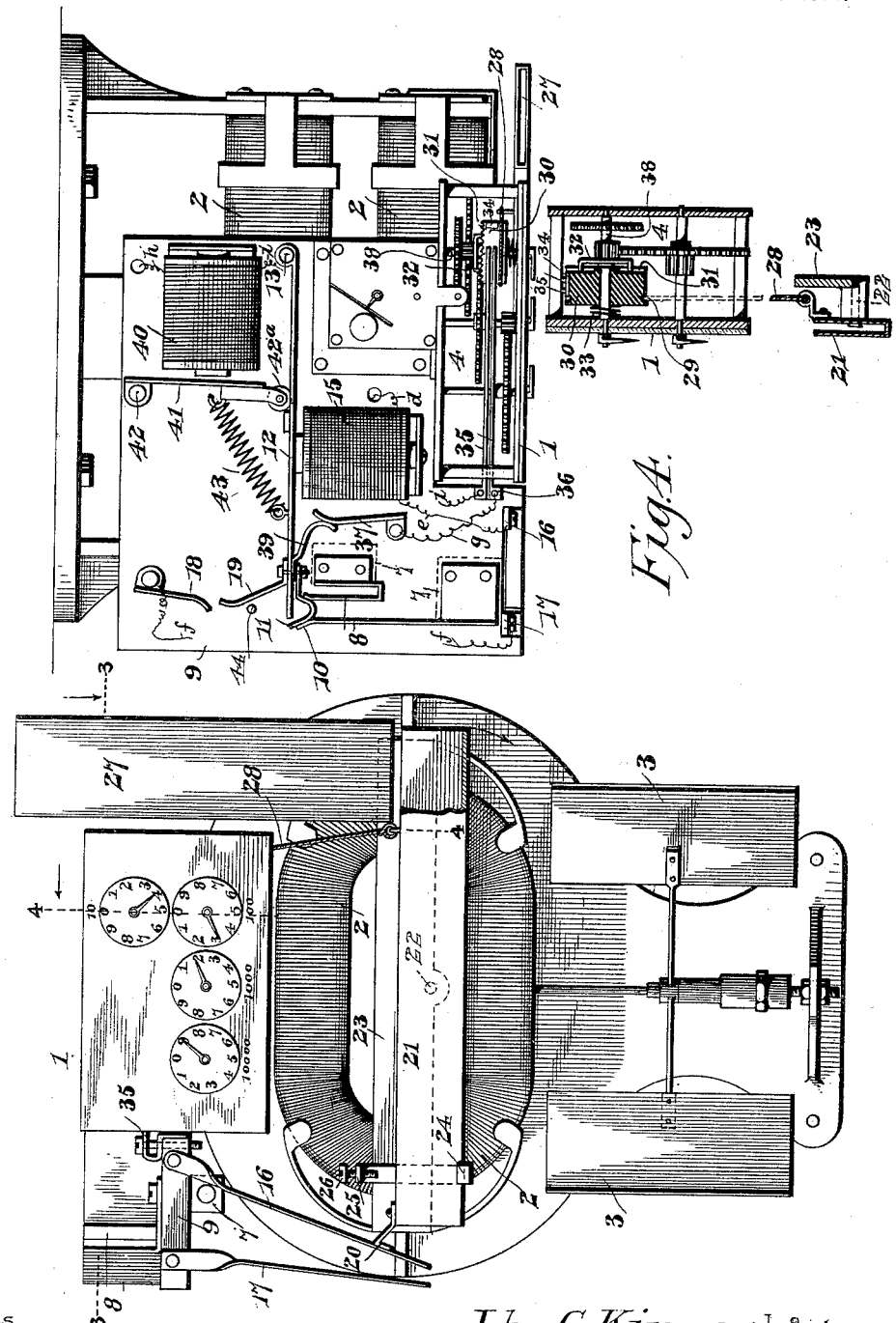
Witnesses
Jas. K. McCathran
[signature]
By his Attorneys.
John C. Kinney Inventor
C. A. Snow & Co.
THE NORRIS PETERS CO., PHOTO-LITHO., WASHINGTON, D. C.

No. 619,187. Patented Feb. 7, 1899.
J. C. KINNEY.
PREPAYMENT MECHANISM FOR ELECTRIC METERS.
(Application filed Apr. 18, 1898.)
(No Model.) 2 Sheets—Sheet 2.
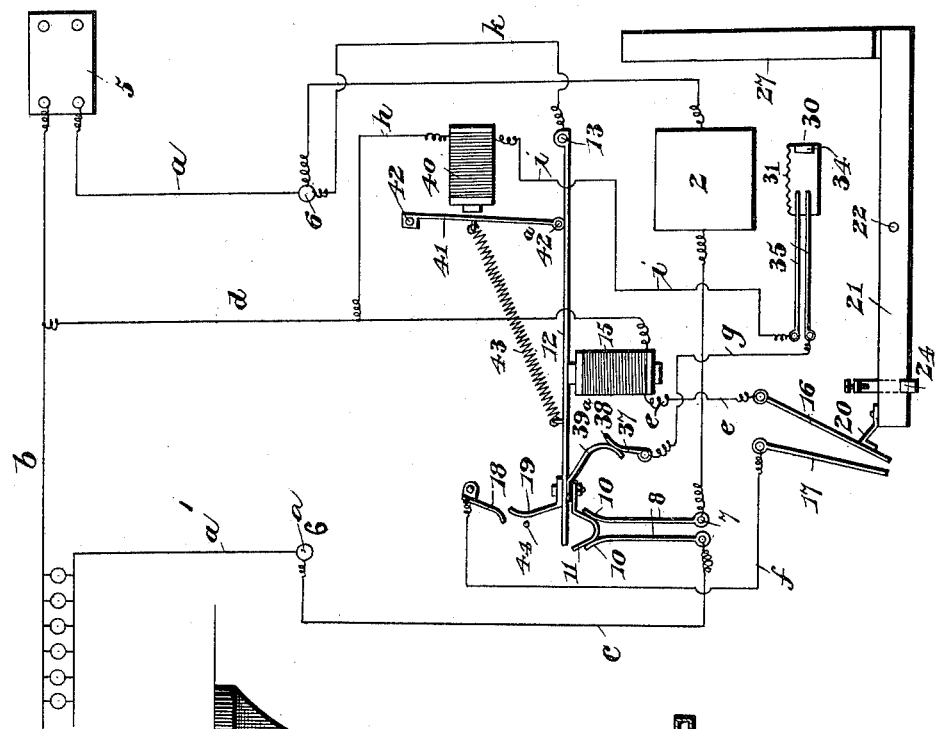
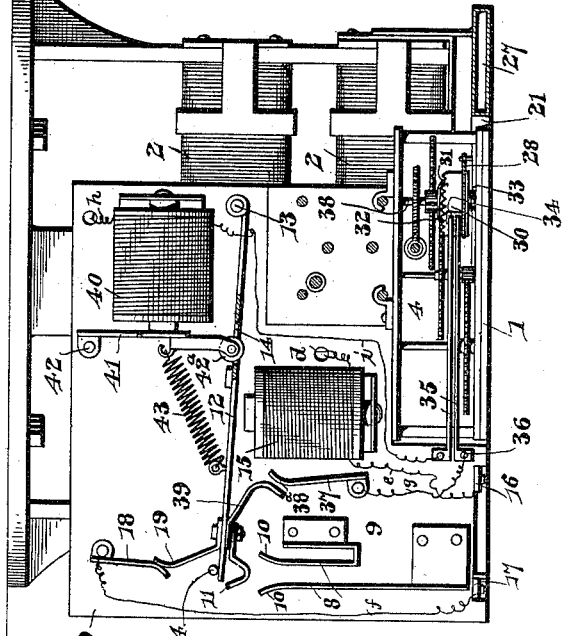
Witnesses
Jas. K. McCathran
[signature]
John C. Kinney Inventor
By his Attorneys.
C. A. Snow & Co.

UNITED STATES PATENT OFFICE.

JOHN C. KINNEY, OF SAN ANTONIO, TEXAS.

PREPAYMENT MECHANISM FOR ELECTRIC METERS.

SPECIFICATION forming part of Letters Patent No. 619,187, dated February 7, 1899.

Application filed April 18, 1898. Serial No. 678,031. (No model.)

*To all whom it may concern:*

Be it known that I, JOHN C. KINNEY, a citizen of the United States, residing at San Antonio, in the county of Bexar and State of Texas, have invented a new and useful Prepayment Mechanism for Electric Systems, of which the following is a specification.

This invention relates to an improved prepayment mechanism for electric meters adapted for use in connection with any ordinary type of electric meter and providing simple and efficient means for automatically opening and closing the circuit through the meter and permitting a predetermined amount of current to pass through the meter, according to the value of the coin which is used to actuate the prepayment mechanism.

With these objects in view the invention consists in the novel construction, combination, and arrangement of parts hereinafter fully described, illustrated, and claimed.

In the drawings, Figure 1 is a front elevation of an electric meter equipped with the prepayment mechanism contemplated by the present invention. Fig. 2 is a top plan view of the same construction. Fig. 3 is a horizontal sectional view of the prepayment mechanism, taken on the line 3 3 of Fig. 1. Fig. 4 is a vertical sectional view in detail on the line 4 4 of Fig. 1, showing more clearly the ratchet-rotated circuit-closing disk for the register mechanism. Fig. 5 is a diagrammatic plan view of the circuit connections with the different parts of the mechanism.

Referring to the accompanying drawings, the numeral 1 designates an electric meter of the well-known "Shallenberger" type.

It will of course be understood that the prepayment mechanism forming the subject-matter of this specification is intended for use in connection with any type of meter, the Shallenberger type being illustrated for convenience in showing the preferable way of mounting the prepayment mechanism and arranging the circuit-wire connections.

As illustrated in the drawings, the meter 1 is provided with the usual meter-coils 2, arranged in multiple, the governing-fan or air-vanes 3, and the register mechanism 4, having the usual dials and indicating-hands to provide for indicating the quantity of current which passes through the meter and is used by the consumer. These are common features of electric meters, and since the coils 2 in multiple constitute practically one coil the same will hereinafter be designated for the sake of clearness as the "meter-coil."

The meter-coil is included directly in circuit with the main-line wires $a$ $a'$ $b$, which are connected in the ordinary manner with the converter 5, which is commonly employed in connection with the service-wiring of a house or building and which is in circuit with the electric meter. One side or wire of the main-line circuit (designated by the letter $b$) has no direct wire connection with the meter, while the other main-line wire is connected with the meter and has its separate terminals $a$ $a'$ connected, respectively, to the meter binding-posts 6 and $6^a$. One terminal of the meter-coil 2 connects with one meter binding-post 6, while the other terminal connects with the binding-post 7 for one of the fixed contact-plates of the pair of such plates 8, which plates are secured fast at one end by any suitable fastening means to a base-board 9, which may be conveniently secured on top of the framework for the meter, as illustrated in the drawings, to provide a base or support for the main working parts of the prepayment mechanism. The other of said contact-plates 8 has connected with the binding-post 7 thereof the meter-circuit wire $c$, which circuit-wire connects with the other meter binding-post $6^a$ in order to complete the main-line circuit through the meter-coil. The free ends of the contact-plates 8 are preferably flared, as at 10, and normally spaced apart, so as to receive therebetween the circuit-closing plug 11, which, together with the plates 8, constitutes the meter-circuit closer for opening and closing the circuit through the meter-coil. The circuit-closing plug for the meter-circuit closer is secured to and insulated from one end of a pivotal main-circuit-closing armature 12, and preferably at one side of such armature, in order that the plug may be readily passed between and be withdrawn from the plates 8, and said main-circuit-closing armature 12 is pivotally secured at one end, as at 13, to the upper side of the base-board 9, so as to have a play horizontally above such base-board.

The main-circuit-closing armature 12 is provided at a point intermediate its ends with a locking opening or slot 14 and is controlled in one direction to provide for closing the circuit through the meter by the setting-magnet 15, mounted in a fixed position on top of the base-board and arranged at one side of the armature 12, so that the core of the magnet will attract the armature when such magnet is energized by the current passing therethrough. One terminal of the setting-electromagnet 15 has a wire connection $d$ with the main-line wire $b$, forming one side of the main-line circuit of the consumer, which main-line circuit, it will be understood, is the circuit having its wires connected with the converter. The other terminal of the setting-magnet 15 has a wire connection $e$ with the movable circuit-closing arm 16, which is arranged at one side of and normally out of contact with the companion fixed circuit-closing arm 17, said circuit-closing arms or plates 16 and 17 constituting what may be properly termed the "primary-circuit closer" of the mechanism, which is thrown into action when a coin is introduced in the chute for the meter. The circuit-closing arms 16 and 17 are preferably secured fast at their upper ends to the front edge of the base-board 9, and the circuit-closing arm 17 has a direct wire connection $f$ with the fixed contact-plate 18, secured fast at one end on the base-board 9 and forming, together with the adjacent movable contact-plate 19, a circuit-closer for the setting-magnet 15, the said contact-plate 19 being secured fast at one end to the armature 12, at one side of the latter, so as to be movable therewith.

The movable circuit-closing arm 16 of the primary-circuit closer is adapted to be engaged by a heel-piece 20, fitted to one extremity of a movable trip-arm 21, and said circuit-closing arm or plate 16 is preferably arranged at an inclination, so that the upward movement of the heel projection 20 thereagainst will serve to force it into contact with the adjacent arm 17, and thereby close a circuit through the setting-magnet 15. The movable trip-arm is preferably arranged at the front side of the meter and is preferably supported intermediate of its ends, as at 22, on a front supporting plate or bar 23, fastened to the meter-frame. The said movable or pivoted trip-arm 21 is preferably arranged to move within a keeper 24, arranged in a fixed position near one end of the arm and provided at its upper end with a forwardly-projecting lip 25, overhanging the arm 21, and provided therein with a threaded opening receiving an adjustable stop-screw 26, which serves to limit the tilt or movement of the arm 21 for a purpose which will be hereinafter more fully explained. The pivotal arm 21 is in the form of a trough and open at one end, immediately above which open end is arranged a vertically-disposed coin-chute 27. The coin-chute 27 is suitably fastened to the meter-frame and may have the upper end thereof exposed in any suitable manner through a slot in the casing for the meter, (not shown,) so that a coin may be readily introduced therein, so as to fall into the pocket of the arm 21, adjacent to the open end thereof. The weight of the coin when it strikes the arm 20 serves to tilt the same and operate the circuit-closer 16 in the manner already explained. Adjacent to the coin-engaged end of the tilting arm 21 the latter has connected thereto one end of a cord or similar flexible connection 28, the other end of which cord is fastened to the grooved portion 29 of a rotatable disk 30, so as to wind on and unwind from the said disk during the operation of the prepayment mechanism and also during the operation of the register mechanism of the meter.

The disk 30 is made of suitable insulated material and is loosely mounted on one of the indicating-shafts of the register mechanism 4 of the meter and is provided at one side with a ratchet-face 31, which normally engages with the pointed extremities of a pawl-plate 32, secured fast on the shaft 38 of the register mechanism directly at one side of the disk 30, the latter being normally held in operative engagement with the pawl-plate by means of a suitable spring 33, arranged at one side thereof. The pawl-and-ratchet rotated insulator-disk 30 has fitted in the periphery thereof a metallic circuit-closing plate 34, which by the rotation of the disk is adapted to be carried into contact with the spaced ends of a pair of brushes 35, having their free ends bearing on the periphery of said disk.

The brushes 35 are made of suitable spring material and are secured fast at one end, as at 36, to the base-board 9. One of the brushes 35 has a wire connection $g$ with a fixed contact-plate 37, secured fast at one end to the base-board 9 and having a beveled free end $38^a$, adapted to be engaged by a movable contact-plate 39, secured to and carried by the main-circuit-closing armature 12, said plates 37 and 39 constituting a circuit-closer for the release-magnet 40, secured in a suitable position on top of the base-board 9. The release-magnet 40 has one of its terminals connected by a wire connection $h$ with the same main-line circuit-wire, as the wire connection $d$ for the setting-magnet 15, and the other terminal of the release-magnet 40 has a wire connection $i$ with the spring contact-brush 35, opposite to the brush having the wire connection $g$ therewith.

The release-electromagnet 40 is arranged in substantial parallelism to the main-circuit armature 12, so that its core will attract the locking-armature 41, pivotally mounted at one end, as at 42, on the base-board 9 and carrying at its free end an antifriction-roller $42^a$, the roller-carrying end of the locking-armature 41 being adapted to engage in the locking opening or slot 14 of the main armature 12. A retractile spring 43 has its opposite ends respectively connected to the armatures 12 and 41 to provide for the movement of these armatures in a direction away from the cores of the magnets which attract the same, it being observed that in order to secure the proper interlocking action of the two armatures the same are arranged in planes substantially at right angles to each other.

To provide for properly completing the circuit connections with the prepayment mechanism hereinafter described, the main-circuit-closing armature 12 has a direct wire connection $k$ with the main-line terminal $a$, preferably at the binding-post 6.

When the circuit through the meter is broken at the meter-circuit closer, the normal position of the different parts is as follows: The primary-circuit closer is open between the contact-plates 16 and 17, the circuit-closer 18 19 for the setting-magnet is closed, and the circuit for the release-magnet is closed at circuit-closer 34 35 and is open at circuit-closer 37 39, such position of parts being illustrated in Fig. 3. With the parts thus positioned no current can pass through the meter-coil 2; but upon the introduction of a coin into the chute 27 such coin will engage against one end of the trip-arm 21 and tilt this arm to a position which will cause the heel projection 20 to force the circuit-closing arm 16 against the circuit-closing arm 17, thereby closing the circuit through the primary-circuit closer, and the current may be explained to pass from the main-line terminal $a$, through the wire $k$, armature 12, circuit-closer 18 19, wire $f$, circuit-closer 16 17, setting-magnet 15, wire $d$, and thence to main-line wire $b$, thereby completing the circuit and causing the current to pass through the magnet 15 and to energize the same. The energization of the magnet 15 causes an attraction of the main-circuit-closing armature 12, and a consequent closing of the meter-circuit closer 10 11, and the circuit-closer 37 39 for the release-magnet 40. With the parts thus positioned the current passes in series through the meter-coil, the meter-circuit closer 10 11, and the main-line-wire terminals $a$ and $a'$, so that the consumer will have the use of the current. When the trip-arm 21 is tilted by the coin, the same draws down upon the flexible connection 28 and, overcoming the tension of the spring 33, causes the disk 30 to slip over the points of the pawl-plate 32 and rotate to a position which carries the metallic plate 34 to a predetermined distance away from the free ends of the contact-brushes 35, which rest on the disk, and the distance that the plate 34 is carried away from the ends of said contact-brushes may be regulated by means of the stop-screw 26. In this way the amount of the current which is allowed to pass through the meter and used by the consumer may be regulated. After the coin has operated the primary-circuit closer and the rotatable disk 30 of what may be properly termed the "register-circuit closer" the movement of the register mechanism 4 serves to rotate the disk 30 until the metallic circuit-closing plate 34 reaches the free ends of the contact-brushes 35, at which moment a circuit will be completed through said brushes and will take the following course: from the main-line terminal $a$ through the wire $k$, the main-circuit-closing armature 12, the circuit-closer 37 39 for the release-magnet, the wire $g$, one of the brushes 35, the plate 34, the other brush 35, the wire $i$, the magnet 40, the wire $h$, and thence through the main-line wire $b$. The completion of this circuit causes an energization of the release-magnet 40 and a consequent attraction of the locking-armature 41. The movement of the locking-armature 41 toward the release-magnet 40 exerts a tension on the spring 43, which causes the main-circuit-closing armature 12 to move away from the setting-magnet 15 and open the circuit-closers 10 11 and 37 39, said armature 12 being prevented from moving too far away from the magnet 15 by engaging against a suitably-arranged stop-pin 44. At the same time the roller-carrying end of the locking-arm armature 41 passes into and through the locking opening or slot 14 of the armature 12. In this operation of the mechanism the current will be cut off from the meter and the parts adjusted to their original positions, so that it will be necessary for another coin to be introduced into the chute before the circuit can be again closed through the meter-coil 2, the meter-circuit closer 10 11, and the meter-circuit wire $c$.

Relative to the action of the locking-armature 41 it will be further observed that when the main-circuit-closing armature 12 is attracted by the setting-magnet 15 the roller-carrying end 42$^a$ of the armature 41 will pass out of the opening 14 and will be drawn by the spring 43 into a position against one side of the armature 12, so as to securely lock the same in place while the current is passing through the meter and being consumed by the user.

From the foregoing it is thought that the construction, operation, and advantages of the herein-described prepayment mechanism for electric meters will be readily apparent to those skilled in the art without further description, and it will be understood that changes in the form and proportion of parts may be resorted to without departing from the principle or sacrificing any of the advantages of the invention.

Having thus described the invention, what is claimed, and desired to be secured by Letters Patent, is—

1. In a prepayment mechanism for electric meters, the combination with a meter and the main circuit for its coil or coils, of a normally open circuit-closer included in the meter-circuit, magnetically-controlled means for respectively opening and closing said circuit-closer, a coin-controlled device for setting into action the means for closing the circuit-closer, and a separate device for setting into action the means for opening said circuit-closer, substantially as set forth.

2. In a prepayment mechanism for electric meters, the combination with the register mechanism of the meter and the main circuit for the meter-coil, of a normally open circuit-closer included in the meter-circuit, separate electomagnetic means for respectively opening and closing said circuit-closer, a coin-controlled device for setting into action the means for closing the circuit-closer, and an automatic register-controlled device for setting into action the means for releasing or opening said circuit-closer, substantially as specified.

3. In a prepayment mechanism for electric meters, the combination with the register mechanism of the meter, and the main circuit for the meter-coil, of a circuit-closer included in the meter-circuit and having a movable member, separate electromagnetic means for respectively moving said movable member of the circuit-closer to operative and inoperative positions, a coin-controlled device for setting into action the means for adjusting said movable member to an operative position, and an automatic register-controlled device for setting into action the means for releasing or moving said movable member to an inoperative position, substantially as set forth.

4. In a prepayment mechanism for electric meters, the combination with the register mechanism of the meter and the main circuit for the meter-coil, of a circuit-closer included in the meter-circuit and having a movable member, a main-circuit-closing armature carrying the movable member of the circuit-closer, an electromagnet for moving said armature in one direction, electrically-controlled means for moving said armature in an opposite direction, a primary-circuit closer included in a circuit with said electromagnet and the main-line connections for the meter, a coin-controlled device for operating the primary-circuit closer, and a register-controlled device for automatically setting into action the means for moving said armature away from its magnet, substantially as specified.

5. In a prepayment mechanism for electric meters, the combination with the register mechanism of the meter, and the main circuit for the meter-coil, of a circuit-closer included in said meter-circuit, and having a movable member, a main-circuit-closing armature carrying the movable member of said circuit-closer, an electromagnet for moving said armature in one direction, a separate electromagnet for moving the armature in the opposite direction, separate local circuits for each of said magnets, a coin-controlled device for closing one of said local circuits, and a separate device for closing the other of said local circuits, substantially as set forth.

6. In a prepayment mechanism for electric meters, the combination with the register mechanism of the meter, and the main circuit for the meter-coil, of a circuit-closer included in the meter-circuit and having a movable member, a main-circuit-closing armature carrying the movable member of the circuit-closer, an electromagnet for moving said armature in one direction, a separate electromagnet for causing the electromagnet to move in the opposite direction, separate local circuits for each of said magnets, a coin-controlled device for one of the local circuits, and a register-controlled device for automatically closing the other of said local circuits, substantially as specified.

7. In a prepayment mechanism for electric meters, the combination with the main circuit, of a circuit-closer included in said circuit and having a movable member, a main-circuit-closing armature carrying the movable member of said circuit-closer, an electromagnet for moving said armature in one direction, a separate electromagnet for causing said armature to move in the opposite direction, coin-controlled means for causing one of said magnets to be energized, and separate means for causing the other of said magnets to be separately and independently energized, substantially as set forth.

8. In a prepayment mechanism for electric meters, the combination with the main circuit, of a circuit-closer included in said circuit and having a movable member, a main-circuit-closing armature carrying the movable member of said circuit-closer, an electromagnet for moving said armature in one direction, a locking-armature pivotally supported at one end and having locking engagement at its other end with said main armature, an electromagnet arranged adjacent to the locking-armature for controlling the movement thereof in one direction, a spring connection between the two armatures, separate local circuits for each of said magnets, a coin-controlled device for closing one of said local circuits, and a separate device for closing the other of said local circuits, substantially as set forth.

9. In a prepayment mechanism for electric meters, the combination with the register mechanism of the meter and the main circuit for the meter-coil, of a circuit-closer included in the meter-coil circuit and having a movable member, a main-circuit-closing armature carrying said movable member of the circuit-closer, a setting-magnet for moving the main armature in one direction, a locking-armature pivotally supported at one end and having a loose locking engagement at its other end with said main armature, a release-magnet for controlling the movement of the locking-armature in one direction, a spring connection between the two armatures, separate circuit-closers respectively for the setting and release magnets, having their movable members carried upon opposite sides of the main armature, a primary-circuit closer included in the circuit with the setting-magnet and the circuit-closer therefor, a circuit-closer operated by the register mechanism and included in a circuit with the release-magnet and the circuit-closer therefor, and a coin-controlled device for operating said primary-circuit closer, substantially as set forth.

10. In a prepayment mechanism for electric meters, the combination with the register mechanism of the meter, and the main circuit for the meter-coil, of a circuit-closer included in the meter-coil circuit and having a movable member, a main-circuit-closing armature carrying the movable member of said circuit-closer, an electromagnet for moving said armature in one direction, a separate electromagnet for causing the armature to move in the opposite direction, separate local circuits for each of said magnets, a primary-circuit closer included in one of the local circuits, a pivotal coin-engaged arm adapted to engage with one of the members of the primary-circuit closer, an insulator-disk mounted on one of the indicating-shafts of the register mechanism and having a pawl-and-ratchet connection therewith, said disk carrying a contact-plate, a flexible connection between the disk and said arm to provide for rotating the disk to an initial position, and a pair of spring contact-brushes included in the other of said local circuits, and contacting with said disk, substantially as specified.

11. In a prepayment mechanism for electric meters, the combination with the register mechanism of the meter, and the main circuit for the meter-coil, of a circuit-closer included in the meter-coil circuit and having a movable member, a main-circuit-closing armature carrying the movable member of said circuit-closer, an electromagnet for moving said armature in one direction, a separate electromagnet for causing the armature to move in the opposite direction, separate local circuits for each of said magnets, a primary-circuit closer included in one of the local circuits, a coin-engaged trip-arm adapted to operate against one of the members of the primary-circuit closer, an adjustable stop for limiting the movement of said trip-arm, an insulator-disk mounted on one of the indicating-shafts of the register mechanism and having a pawl-and-ratchet connection therewith, said disk carrying a contact-plate, a flexible connection arranged to wind and unwind on the disk and connected with the trip-arm, and a pair of spring contact-brushes included in the other of said local circuits, and contacting with the periphery of said disk, substantially as specified.

In testimony that I claim the foregoing as my own I have hereto affixed my signature in the presence of two witnesses.

JOHN C. KINNEY.

Witnesses:
 ED. BRADEN, Jr.,
 A. COLLMANN.